United States Patent Office
3,404,139
Patented Oct. 1, 1968

3,404,139
METHOD OF POLYMERIZING ALPHA-OLEFINS
Osamu Fukumoto and Yuji Atarashi, Ohtsu-shi, Shiga-ken, Japan, assignors to Toyo Rayon Kabushiki Kaisha, Tokyo, Japan, a corporation of Japan
No Drawing. Filed Apr. 6, 1964, Ser. No. 357,809
Claims priority, application Japan, Apr. 27, 1963, 38/21,975; June 8, 1963, 38/30,257; Aug. 24, 1963, 38/44,045; Sept. 9, 1963, 38/47,730
2 Claims. (Cl. 260—93.7)

ABSTRACT OF THE DISCLOSURE

A process for polymerizing alpha-monoolefins by the use of a catalyst comprising the following three components:

(1) An organoaluminum dihalide or sesquihalides;
(2) A halide of a transition metal of Groups IV-A–VI-A of the Periodic Table; and
(3) A compound selected from the group of silozanes aminosulfides, aminosulfoxides or aminosulfanes.

This invention relates to a method of polymerizing alpha-olefins. More particularly, it relates to a method of polymerizing alpha-olefins in which method is used a catalyst composition containing at least the following three components:

(1) An organic aluminum dihalide having the formula $RAlX_2$ or an organic aluminum sesquihalide having the formula $R_3Al_2X_3$, in each of which formulas R is a hydrocarbon radical having 1–15 carbon atoms and X is a halogen atom;
(2) A halide of a transition metal of Groups IVa–VIa of the Periodic Table; and
(3) At least one of the compounds of the group consisting of silazanes, aminosulfides, aminosulfoxides or aminosulfones.

A great number of compositions have been proposed as catalysts for use in polymerizing alpha-olefins, such as ethylene, propylene and butene-1. One of the typical among these compositions is one consisting of a titanium halide, such as titanium trichloride or titanium tetrachloride, and an organic aluminum compound, such as triethylaluminum or diethylaluminum chloride. It is known that highly crystalline polymers of alpha-olefins can be obtained by using such a composition. Although this catalyst composition exhibits excellent performance, it has some drawbacks, for example, it is expensive owing to the fact that the manufacturing process of the triethylaluminum or diethylaluminum chloride is complicated and triethylaluminum and diethylaluminum chloride are strongly pyrophilic when in contact with air.

It is an object of this invention to provide a catalyst composition having as its catalyst component an organic aluminum halide whose production is simpler than that of triethylaluminum or diethylaluminum chloride, thereby making it possible to produce the alpha-olefin polymers at a lower cost.

All other objects of this invention will in part be obvious and will in part appear hereinafter.

The organic aluminum sesquihalide of the formula $R_3Al_2X_3$, wherein R is a hydrocarbon radical containing 1–15 carbon atoms and X is a halogen, is made, for example, from a halogenated hydrocarbon and metallic aluminum, and its manufacturing process is much simpler than that of trialkylaluminum or dialkylaluminum chloride. Similar procedures can also be applied in the case of the organic aluminum dihalide having the formula $RAlX_2$, wherein R and X are as above defined (e.g., monoalkylaluminum dihalide). Moreover, organoaluminum dihalides are less pyrophilic than above mentioned trialkyl- or dialkylaluminum compounds. Hence, it is obvious that it would be to great advantage commercially if it were possible to use these organic aluminum halides having the formula $R_3Al_2X_3$ or $RAlX_2$ instead of the conventional trialkylaluminum or dialkylaluminum chloride. However, even though compositions consisting of these organic aluminum halides and titanium halide are used as catalyst in polymerizing alpha-olefins, satisfactory results are not obtained, since not only is the polymerization velocity exceedingly low, but also highly crystalline polymers capable of being used as the raw material of fibers, films and other shaped structures cannot be obtained.

Thus, in order to solve this problem, we engaged in extensive researches and as a result became aware of the necessity for the incorporation of a third component. We have found that the polymerization velocity of alpha-olefins could be enhanced greatly and that highly crystalline polymers useful as raw materials of the various classes of shaped structures could be readily formed by the use as catalyst a composition containing at least the following three components, namely:

(1) An organic aluminum halide having the formula $RAlX_2$ or $R_3Al_2X_3$;
(2) A halide of a transition metal of Groups IVa–VIa of the Periodic Table; and
(3) A compound of the group consisting of silazanes, aminosulfides, aminosulfoxides or aminosulfones.

The organic aluminum halide, the first component of the catalyst composition according to this invention, is divided into two main classes; the organic aluminum dihalides having the formula $RAlX_2$, wherein R is a hydrocarbon radical containing 1–15 carbon atoms and X is a halogen atom, particularly chlorine, bromine or iodine; and the organic aluminum sesquihalides having the formula $R_3Al_2X_3$, wherein R and X are as above defined. Suitable compounds falling within the group consisting of the organic aluminum dihalides of the formula $RAlX_2$ include methylaluminum dichloride, ethylaluminum dichloride, ethylaluminum dibromide, ethylaluminum diiodide, n-propylaluminum dichloride, isopropylaluminum dibromide, 2 - ethylhexylaluminum dichloride, dodecylaluminum dibromide, phenylaluminum dichloride, benzylaluminum dichloride, and p-methylbenzylaluminum dibromide. On the other hand, the compounds useful according to this invention, which fall within the group consisting of the organic aluminum sesquihalide of the formula $R_3Al_2X_3$ are exemplified by such as methylaluminum sesquiiodide, ethylaluminum sesquichloride, ethylaluminum sesquibromide, ethylaluminum sesquiiodide, isopropylaluminum sesquichloride, n-propylaluminum sesquibromide, n - butylaluminum sesquichloride, benzylaluminum sesquichloride and phenylaluminum sesquibromide.

As the halide of a transition metal of Groups IVa–VIa of the Periodic Table, the second component of the catalyst composition according to the invention, particularly suitable are the halides of titanium, zirconium, vanadium, chromium and molybdenum. Typical examples include such as titanium dichloride, titanium trichloride, titanium tetrachloride, zirconium tetrachloride, vanadium trichloride, vanadyl trichloride, vanadyl dichloride, chromium chloride and molybdenum pentachloride. The foregoing component, is not limited to the chlorides, but also includes, needless to say the corresponding bromides as well as iodides. Of these transition metal halides, titanium trichloride is particularly suitable for polymerizing propylene and the alpha-olefins higher than propylene. Titanium trichloride can be made by such processes as by reducing titanium tetrachloride using a reducing agent such as hydrogen, metallic aluminum, zinc, antimony, copper and other metals, or by reacting titanium tetrachloride with an alkylaluminum compound, or by the pyrolysis of alkyltitanium trichloride. Titanium trichloride made by any of the foregoing processes may be used according to the method of this invention. Further, the activity of these titanium trichlorides can be especially enhanced if they are used after having been first mechanically pulverized or heated to above 400° C. in vacuum, particularly in the absence of moisture and oxygen.

The third component of the catalyst composition according to the invention may be selected optionally from the group of compounds consisting of silazanes, aminosulfides, aminosulfoxides and aminosulfones.

Examples of suitable silazanes include such as hexamethyl-N-methylsilazane, hexamethyldisilazane, N-allylhexaethyldisilazane, tetramethyldiethyldisilazane, hexaethyldisilazane, hexaphenyldisilazane, hexakis(p-tolyl)disilazane, hexamethylcyclotrisilazane, octamethylcyclotetrasilazane, hexaethylcyclotrisilazane, cyclotrisilazane, cyclotetrasilazane and N-phenylsilylpropylhexamethyldisilazane.

The useful aminosulfides, aminosulfoxides and aminosulfones are those compounds which in all cases have two sulfur-nitrogen bonds in their molecules, the respective compounds being represented by the following formulas:

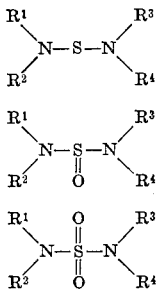

wherein $R^1$ and $R^2$ are selected from the group consisting of hydrogen and hydrocarbon radicals containing 1–12 carbon atoms, and $R^3$ and $R^4$ are hydrocarbon radicals containing 1–12 carbon atoms, of which $R^1$, $R^2$, $R^3$ and $R^4$, two or more may be the same radical and of the two pairs, $R^1$ and $R^2$, and $R^3$ and $R^4$, either or both may form a ring. Useful compounds falling within these classifications are exemplified by such as bis (dimethylamino)sulfide, bis-(ethylamino)sulfide, bis(diethylamino)sulfide, bis(disopropylamino)sulfide, bis(n - butylamino)sulfide, bis(t-butylamino)sulfide, bis(diisobutylamino)sulfide, bis-(phenylamino)sulfide, bis(diphenylamino)sulfide, bis-(methyl-ethylamino)sulfide, bis(p-tolylamino)sulfide, bis-(dicyclohexylamino)sulfide, bis(methyl-phenylamino)sulfide, bis(phenyl p-naphthylamino)sulfide, dipiperidinosulfide, difluorenylsulfide, dipyrrole sulfide and the corresponding sulfoxides and sulfones.

The use of these third component compounds in the catalyst composition of the invention need not necessarily be limited to a single class but two or more classes can be used.

Even though the composition of the foregoing three components is varied over a wide range, the catalyst composition of the invention still exhibits its excellent performance. Normally, constantly satisfactory results are obtained when the catalyst composition is in a proportion such that to each 1 mol of the first component compound are blended 0.1–4 mols of the second component compound and 0.05–4 mols, preferably 0.1–2 mols, and still more preferably 0.2–1 mol or 0.4–0.6 mol, of the third component compound. Since the activity of the catalyst composition of this invention is influenced by the proportion in which the first component compound and third component compound are blended, the proportion of the blend must be suitably selected in accordance with the end in view.

The method of polymerization according to the present invention makes it possible to carry out the polymerization reaction without using a solvent; namely, by contacting the catalyst composition with the monomer in the vapor phase. Again, the polymerization can also be accomplished without using a solvent by carrying out the reaction in the monomer in its liquid state, the composition being incorporated therein. It is most generally practiced however by using an inert solvent. As the inert solvent, especially suitable are the nonpolymerizable hydrocarbons and chlorinated hydrocarbons. Representative of these solvents are, for example, the saturated aliphatic hydrocarbons such as pentane, hexane, heptane, octane and decane, the alicyclic hydrocarbons such as cyclohexane, methylcyclohexane and decahydronaphthalene, the aromatic hydrocarbons such as benzene, toluene, xylene, ethylbenzene and tetrahydronaphthalene, and the aromatic chlorinated hydrocarbons such as chlorobenzene, o-dichlorobenzene and alpha-chloronaphthalene. However, also suitable are the hydrocarbon mixtures such as white kerosene, petroleum benzine, ligroin and petroleum ether. Regardless of which solvent is to be used, it is preferred that prior to its use it be dehydrated and purified.

The polymerization reaction can be carried out by either the continuous or batch-wise method. In order to obtain polymers having uniform properties in the case of the continuous method, the composition of the catalyst composition in the polymerization vessel is desirably maintained constant at all times. This can be accomplished, for example, by first mixing the several catalyst components in the solvent in the prescribed molar proportions and then continuously introducing this mixture into the polymerization vessel. Again, the polymerization catalyst mixture can be heat treated at 60–150° C. before using.

Normally, a temperature of 0–200° C. is employed for the polymerization reaction, a range of 50–150° C. being particularly suitable. While the polymerization pressure to be used will depend on the class of the monomer to be polymerized, there is no particular restriction. When polymerizing propylene, its polymerization is possible even at subatmospheric pressures on account of the great activity possessed by the catalyst composition of this invention, but for attaining a commercially economical polymerization velocity, it is also to advantage to carry out the polymerization reaction under a superatmospheric pressure of the order of less than 10 kg./cm.$^2$, and normally several kg./cm.$^2$. Although the polymerization reaction can be carried out at an elevated pressure of up to 100 kg./cm.$^2$, or even higher, such a high pressure is usually unnecessary.

The alpha-olefins to which the method of the present invention can be applied with good results are those containing 2–12 carbon atoms and include not only the straight-chain alpha-olefins such as ethylene, propylene, butene-1, pentene-1 and decene-1, but also the branched alpha-olefins such as 3-methylbutene-1, 4-methylpentene-1 and 4-methylhexene-1, as well as allyl benzene, styrene, o-methylstyrene, and other nucleus-substituted styrenes. Also included are the alpha-olefins having a cyclic hydrocarbon such as vinyl cyclohexane.

The scope of this invention comprehends not only the homopolymerization of these alpha-olefins but also the copolymerization thereof by using a mixture of two or more classes as well as the copolymerization with olefins other than alpha-olefins, such as butadiene, vinyl cyclohexene, isoprene and cyclohexadiene.

The average molecular weight of the polymer formed can be controlled by effecting the presence of hydrogen during the polymerization reaction. The presence of a small amount of hydrogen frequently enhances the polymerization velocity. The presence in the polymerization system along with hydrogen of molecular weight controlling agents other than hydrogen such as, for example, the halides or alkyl compounds of zinc, cadmium and mercury, or halogenated hydrogen or alkyl halides is also permissible.

According to the present invention, the addition of molecular weight controlling agents such as hereinabove mentioned is important in most instances. In the post-treatment of the reaction product, the post-treatment procedures of the conventional olefin polymerization process in which an organometallic catalyst is used can be applied without change. For example, the procedure in which, with or without separating the polymerization catalyst, either alcohols such as methanol, propanol and butanol are added, or washing with an aqueous washing liquid such as hydrochloric acid can be adopted. Alternatively, a method in which the catalyst residue is solubilized by adding a chelating agent such as acetyl acetone, amines, ammonia, or caustic soda can also be employed.

For purpose of illustration only, this invention will now be illustrated by the following examples. Of course, this invention shall not be limited to the following examples. Examples 1 and 2 are however examples given by way of comparison, in which catalyst compositions other than that of the present invention have been used.

EXAMPLE 1

A magnetic stirred-equipped 200 cc. autoclave was charged under dried nitrogen atmosphere with 60 cc. of purified n-heptane, 2 mmols (as $TiCl_3$) of titanium trichloride (obtained by reducing titanium tetrachloride with metallic aluminum and then comminuting; the titanium trichloride used in the subsequent examples was one similarly obtained) and 4 mmols of ethylaluminum dichloride, the lid of the autoclave was closed and then after its interior space was completely substituted with propylene, propylene was introduced up to a gauge pressure of 2 kg./cm.$^2$. The autoclave was then heated in an electric furnace, with stirring, to raise the temperature to 60° C. in 20 minutes while the propylene pressure inside the autoclave was adjusted to 5 kg./cm.$^2$ gauge. The polymerization reaction was then carried out for 8 hours while maintaining the foregoing pressure and temperature constant. After completion of the polymerization, the autoclave was opened and an isopropanol-methanol (50:50) mixture was added, but the formation of solid polymers was not observed at all.

EXAMPLE 2

An autoclave as used in Example 1 was charged as in said example with 60 cc. of purified n-heptane, 5 mmols (as $TiCl_3$) of titanium trichloride and 5 mmols of ethylaluminum sesquichloride [$(C_2H_5)_3Al_2Cl_3$] and then, except that the polymerization time was 5 hours, the same procedures as described in Example 1 were otherwise followed in carrying out the treatment. No formation whatsoever of solid polymers could be observed.

EXAMPLES 3–9

Each of the 360 cc. pressure-resistant glass bottles were charged under a nitrogen atmosphere with 150 cc. of purified heptane, 3.4 mmols of titanium trichloride, 13.6 mmols of ethylaluminum dichloride and one of the various silazanes listed in Table I, and after replacing the interior of the glass bottles with propylene, propylene was introduced up to 3 kg./cm.$^2$ gauge at room temperature. The polymerization reaction was then carried out in a hot water bath at 50° C. while shaking the bottles. A methanol-isopropanol (50:50) mixture was added to the reaction products to decompose the catalyst, after which solid polymers were separated by filtration. The solid polymers were further washed in methanol by boiling under reflux and were finally dried in a 60° C. vacuum drier. The results obtained are shown in Table I.

TABLE I

| Example | Silicon compound | Amount used, mmol. | Molar ratio Si/Ti | Polymer yield, g. | $\eta_{sp}/c$. |
|---|---|---|---|---|---|
| 3 | $[(CH_3)_3Si]_2NH$ | 3.4 | 1.0 | 12.2 | 8.87 |
| 4 | $[(CH_3)_3Si]_2NH$ | 6.8 | 2.0 | 20.0 | 9.43 |
| 5 | $[(CH_3)_3Si]_2NCH_3$ | 3.4 | 1.0 | 14.5 | 8.54 |
| 6 | $[(CH_3)_3Si]_2NCH_3$ | 6.8 | 2.0 | 16.8 | |
| 7 | $[(CH_3)_2SiNH]_3$ | 3.4 | 1.0 | 13.1 | |
| 8 | $[(CH_3)_2SiNH]_3$ | 6.8 | 2.0 | 19.0 | |
| 9 | $[(CH_3)_2SiNH]_4$ | 3.4 | 1.0 | 15.5 | |

The polymers obtained were in all cases of high molecular weight and of excellent crystallinity. The results obtained when these polymers were extracted with boiling n-heptane was, for example, an insolubility of 94.5% in the case of the sample of Example 15 and 97% in the case of that of Example 20. By way of comparison, when the polymerization was carried out under identical conditions as above but without the addition of a silicon compound, the formation of a solid polymer could not be observed.

EXAMPLE 10

Following the procedures described in Examples 3–9, the polymerization was carried out except that vanadium trichloride was used instead of the titanium trichloride. Namely, 150 cc. of n-heptane, 3.4 mmols of vanadium trichloride, 13.6 mmols of ethylaluminum dichloride and 5.1 mmols of hexamethyldisilazane were placed in a pressure-resistant glass bottle, and the polymerization reaction was carried out for 24 hours at 50° C. by introducing propylene to a pressure of 3 kg./cm.$^2$. As a result, 7.54 g. of a solid polymer were obtained having $\eta_{sp./c.}=5.38$.

EXAMPLES 11–14

Each of the 360 cc. pressure-resistant glass bottles was charged under a nitrogen atmosphere with 150 cc. of purified heptane, 3.4 mmols of titanium trichloride, 6.8 mmols of ethylaluminum sesquichloride and one of the various silazanes listed in Table II. The inside of the glass bottles were replaced with propylene and then propylene was introduced to a pressure of 3 kg./cm.$^2$ gauge, after which the polymerization reaction was carried out for 24 hours while shaking the bottles in a 50° C. hot water bath. A methanol-isopropanol (50:50) mixture was then added to the reaction products to decompose the catalyst, after which solid polymers were separated by filtration. The resulting solid polymers were washed by boiling under reflux in methanol and then dried in a 60° C. vacuum drier. The results obtained are shown in Table II.

TABLE II

| Example | Silicon compound | Amount used, mmol. | Molar ratio Si/Ti | Polymer yield, g. | $\eta_{sp}/c$. |
|---|---|---|---|---|---|
| 11 | $[(CH_3)_3Si]_2NH$ | 3.4 | 1.0 | 16.5 | 13.1 |
| 12 | $[(CH_3)_3Si]_2NCH_3$ | 3.4 | 1.0 | 20.2 | 13.6 |
| 13 | $[(CH_3)_2SiNH]_3$ | 3.4 | 1.0 | 20.7 | 8.26 |
| 14 | $[(CH_3)_2SiNH]_4$ | 3.4 | 1.0 | 20.5 | |

By way of comparison, when the polymerization was carried out under identical conditions as described above but without the addition of a silicon compound, no formation of a solid polymer could be observed.

EXAMPLES 15–20

Each of the 360 cc. pressure-resistant glass bottles was charged under a nitrogen atmosphere with 150 cc. of purified heptane, 3.4 mmols of titanium trichloride, 6.8 mmols of ethylaluminum sesquichloride and one of the various aminosulfides, aminosulfoxides or aminosulfones listed in Table III. Then, after replacing the inside of the bottles with propylene, propylene was introduced at room temperature up to a pressure of 3 kg./cm.$^2$ gauge, following which the polymerization reaction was carried out for 24 hours in a 50° C. hot water bath while shaking the bottle. A methanol-isopropanol (50:50) mixture was then added to the reaction products to decompose the catalyst, after which solid polymers were separated by filtration. These solid polymers were then washed by boiling under reflux in methanol and finally were dried in a 60° C. vacuum drier. The results obtained are shown in Table III.

TABLE III

| Example | Sulphur compound | Amount used, mmol. | Molar ratio Si/Ti | Polymer yield, g. | $\eta_{sp./c.}$ |
|---|---|---|---|---|---|
| 15 | [(CH₃)₂N]₂S | 3.4 | 1.0 | 13.5 | 11.4 |
| 16 | [(CH₂)₃N]₂SO | 1.7 | 0.5 | 10.9 | 13.5 |
| 17 | [(C₂H₅)₂N]₂S | 3.4 | 1.0 | 17.9 | 11.3 |
| 18 | $\left[\begin{array}{c}H_2C-CH_2\\ |\\ H_2C-CH_2\end{array}N\right]_2 S$ | 2.7 | 0.8 | 17.8 | 10.5 |
| 19 | [(CH₃)₂N]SO₂ | 3.4 | 1.0 | 19.8 | 9.6 |
| 20 | [(C₂H₅)₂N]SO₂ | 3.4 | 1.0 | 20.2 | 10.1 |

By way of comparison, when the polymerization was carried out under identical conditions as above but without the addition of a sulfur compound, hardly any formation of solid polymers could be observed.

EXAMPLE 21

A 200-cc. autoclave was charged with 80 cc. of petroleum benzine, 2.5 mmols of vanadium trichloride, 5.0 mmols of ethylaluminum sesquichloride and 1.8 mmols of bis(diethylamino)sulfone, then after its inside was replaced with propylene, the polymerization reaction was carried out for 4 hours at 70° C. while feeding propylene so that a propylene pressure of 5 kg./cm.² gauge was maintained. The reaction product was post-treated after the procedure described in Examples 27-31 to yield 17.8 g. of polypropylene having a melting point of 172° C.

EXAMPLE 22

The autoclave employed in Example 21 was charged with 80 cc. of petroleum benzine, 2.0 mmols titanium trichloride, 5.0 mmols of ethylaluminum sesquibromide and 2.0 mmols of dipiperidinosulfone, after which the polymerization reaction was carried out for 4 hours under the conditions of a polymerization temperature of 60° C. and a propylene pressure of 5 kg./cm.² gauge. The reaction product was purified by repeatedly washing with methanol to obtain 28.3 g. of a solid polymer. The insolubility of this polymer in boiling n-heptane was 92.3% and its $\eta_{sp./c.}$ was 7.63 (in tetralin at 135° C. and c.=0.2 g./100 cc.).

EXAMPLE 23

A 180-cc. pressure-resistant glass bottle was charged under a nitrogen atmosphere with 60 cc. of n-heptane, 2 mmols of titanium trichloride, 4 mmols of ethylaluminum sesquichloride and 1.5 mmols of bis(dimethylamino)sulfide, then after adding 13.35 g. of 4-methylpentene-1, the polymerization reaction was carried out for 24 hours at 60° C. while shaking the bottle. The reaction product was treated with methanol, followed by vacuum drying of the resulting solid polymer at 60° C. The yield was 7.15 g.

What we claim is:

1. A method of polymerizing alpha-monoolefins having from 2 to 12 carbon atoms which comprises effecting said polymerization using as catalyst: (1) an organic aluminum halide selected from the group consisting of organic aluminum dihalides represented by the formula RAlX₂, where R is a hydrocarbon radical containing 1–15 carbon atoms and X is a halogen atom, and organic aluminum sesquihalides represented by the formula R₃Al₂X₃, where R and X are as above defined; (2) a halide of a transition metal of Groups IVa–VIa of the Periodic Table; and (3) at least one compound selected from the group consisting of compounds of the formulae:

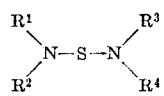

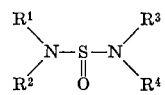

and

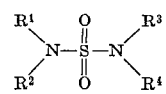

wherein R¹ and R² are selected from the group consisting of hydrogen, hydrocarbon radicals containing from 1 to 12 carbon atoms, and radicals which together form a heterocyclic ring with the nitrogen atom; and R³ and R⁴ are selected from the group consisting of hydrocarbon radicals containing from 1 to 12 carbon atoms and radicals which together form a heterocyclic ring with the nitrogen atom; and compounds of the formulae:

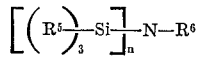

and

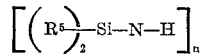

wherein R⁵ is selected from the group consisting of lower alkyl and aryl radicals; R⁶ is selected from the group consisting of hydrogen and lower hydrocarbon radicals; and n is an integer from 2 to 4.

2. A method of polymerizing alpha-olefins which comprises effecting the polymerization of alpha-monoolefins containing 2–12 carbon atoms at a temperature of 0–200° C. and a pressure of 0–100 kg. per square centimeter, using as catalyst a composition consisting of (1) one mole of an organic aluminum halide selected from the group consisting of organic aluminum dihalides represented by the formula RAlX₂, where R is a hydrocarbon radical containing 1–15 carbon atoms and X is a halogen atom, and organic aluminum sesquihalides represented by the formula R₃Al₂X₃, where R and X are as above defined; (2) 0.1–4 mols of a halide of a transition metal of Groups IVa–VIa of the Periodic Table; and (3) 0.05–4 mols of at least one compound selected from the group consisting of compounds of the formulae:

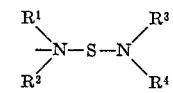

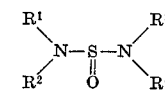

and

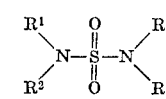

wherein R¹ and R² are selected from the group consisting of hydrogen, hydrocarbon radicals containing from 1 to 12 carbon atoms, and radicals which together form a heterocyclic ring with the nitrogen atom; and R³ and R⁴ are selected from the group consisting of hydrocarbon radicals containing from 1 to 12 carbon atoms and radicals which together form a heterocyclic ring with the nitrogen atom; and compounds of the formulae:

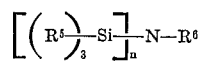

and

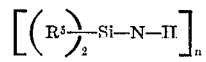

wherein R⁵ is selected from the group consisting of lower alkyl and aryl radicals; R⁶ is selected from the group consisting of hydrogen and lower hydrocarbon radicals; and $n$ is an integer from 2 to 4.

References Cited
UNITED STATES PATENTS

| | | | |
|---|---|---|---|
| 3,196,137 | 7/1965 | Cain | 260—93.7 |
| 3,026,311 | 3/1962 | Coover et al. | 260—93.7 |
| 3,300,465 | 1/1967 | Bayer et al. | 260—93.7 |
| 3,303,175 | 2/1967 | Achon | 260—88.2 |
| 3,318,858 | 5/1967 | Nakaguchi et al. | 260—93.7 |

JOSEPH L. SCHOFER, *Primary Examiner.*

M. B. KURTZMAN, *Assistant Examiner.*